United States Patent [19]

Wine

[11] Patent Number: 4,979,047

[45] Date of Patent: Dec. 18, 1990

[54] AUTOMATICALLY ACTIVATED COMMERCIAL MESSAGE TIMER

[75] Inventor: Charles M. Wine, Princeton, N.J.

[73] Assignee: RCA Licensing Corporation, Princeton, N.J.

[21] Appl. No.: 312,517

[22] Filed: Feb. 21, 1989

[51] Int. Cl.$^5$ .............................................. H04N 5/76
[52] U.S. Cl. .................................... 358/335; 358/165; 358/908
[58] Field of Search .................... 366/14.1, 13, 33.1; 358/908, 142, 143, 139, 181, 84, 335, 908, 165

[56] References Cited

U.S. PATENT DOCUMENTS

| | | | |
|---|---|---|---|
| 3,748,645 | 7/1973 | Kawashima | 340/168 R |
| 3,870,956 | 3/1975 | Wolff | 325/478 |
| 4,088,958 | 5/1978 | Suzuki et al. | 325/396 |
| 4,229,765 | 10/1980 | Sanger | 358/188 |
| 4,283,735 | 8/1981 | Jagger | 358/4 |
| 4,319,286 | 3/1982 | Hanpachern | 360/33 |
| 4,333,110 | 6/1982 | Faerber et al. | 358/165 |
| 4,390,904 | 6/1983 | Johnston et al. | 358/335 |
| 4,405,946 | 9/1983 | Knight | 358/192.1 |
| 4,420,769 | 12/1983 | Novak | 358/139 |
| 4,602,297 | 6/1986 | Reese | 360/14.1 |
| 4,618,895 | 10/1986 | Wright | 358/908 |
| 4,727,446 | 2/1988 | Kaaden | 366/137 |
| 4,750,052 | 6/1988 | Poppy et al. | 358/908 |
| 4,750,053 | 6/1988 | Allen | 358/908 |
| 4,751,574 | 6/1988 | Mogi et al. | 358/147 |
| 4,752,834 | 6/1988 | Koombes | 358/908 |
| 4,782,401 | 11/1988 | Faerber et al. | 358/335 |
| 4,813,014 | 3/1989 | DeBell | 366/32 |
| 4,918,531 | 4/1990 | Johnson | 358/183 |

FOREIGN PATENT DOCUMENTS 3228354 2/1984 Fed. Rep. of Germany .

OTHER PUBLICATIONS

Co-pending U.S. patent application Ser. No. 261,243, (Johnson), filed Oct. 25, 1988, entitled Commercial Message Timer.

Primary Examiner—Robert L. Richardson
Attorney, Agent, or Firm—Joseph S. Tripoli; Peter M. Emanuel; Thomas F. Lenihan

[57] ABSTRACT

A commercial message timer stores data indicative of a first tuned station in response to a channel change command and begins repeatedly timing a predetermined time period. Upon each expiration of the time period, the user is reminded that the commercial message on the first tuned station may be over. In this way a user can avoid a commercial message on a first channel by setting the timer and scanning through other channels, and yet be reminded to return (e.g. by use of a PC (previous-channel) key) to the first channel at the end of a time period substantially equal to that of a typical commercial message. In another embodiment employing a videocassette recorder (VCR) the commercial timer is activated upon pressing the PAUSE key of the VCR so that the user may avoid recording the commercial message on videotape.

21 Claims, 7 Drawing Sheets

AUTOMATICALLY ACTIVATED COMMERCIAL MESSAGE TIMER

FIELD OF THE INVENTION

This invention concerns the field of tuning systems with timers for use in radio/VCR/television receivers.

BACKGROUND OF THE INVENTION

It is standard practice in the United States and in other countries for broadcasters to insert into program material, at various times, a number of commercial messages of the program's sponsors. Many viewers find these messages to be an irritating interruption.

Accordingly, many techniques have been devised in an effort to avoid these commercial messages. One such technique is to mute the sound in response, for example, to the operation of a MUTE pushbutton on a remote control handunit. A remote control having such a mute function is known from the RCA CRK33 remote control transmitter handunit manufactured by Thomson Consumer Electronics, Inc., Indianapolis, Ind.

An improved sound muting technique is known from U.S. Pat. No. 3,870,956 (Wolff) issued 11 March 1975. Wolff discloses a circuit to mute the sound of a television receiver for a predetermined time, at the end of which time the receiver sound circuitry is automatically unmuted. The circuitry of Wolff, however, does not affect the video, and thus a viewer is subjected to a series of silent commercial messages.

Unfortunately, muting the sound does not remove the video of the unwanted commercial message. In addition, the viewer must watch the commercial in order to known when it has ended, and therefore, when the viewer can "unmute" the sound.

Of course, a viewer may simply select (i.e., "tune to") a second channel when a commercial message is displayed on a currently selected channel. A problem with this technique is that the viewer has no way of knowing when the commercial message on the originally selected channel has finished. Consequently, the viewer may be late in returning to the original channel, and may miss a portion of the program he was watching A commercial message timer is known from co-pending U.S. patent application Ser. No. 261,243 (Johnson) filed 24 October 1988, entitled COMMERCIAL MESSAGE TIMER. In apparatus according to Johnson, a timer in a receiver is manually activated in response to the operation of a TIMER key, and may provide a countdown display on, for example, a television receiver display screen. If a channel change key is pressed while the timer is active, the current channel is stored and will be automatically retuned at the end of the timer period, unless a CLEAR key is pressed to cancel the function.

While the system of Johnson performs well, it requires two key activations each time a commercial is to be avoided (i.e., a TIMER key and a channel change key) and requires the activation of a CLEAR key to avoid automatic retuning of the original channel.

SUMMARY OF THE INVENTION

In order to overcome the above-stated problems, it is desirable that a tuning system include a timer circuit which is automatically started, e.g., by the action of changing channels or, activating a PAUSE key in a VCR, to avoid a commercial message. A display element coupled to the timer circuit, upon expiration of a predetermined time period, indicates that the time period has expired, so that the viewer may, if he chooses, return to the original channel or the "unpaused" mode in a VCR.

In one embodiment of the invention, the commercial timer function may be disabled by the user.

In another embodiment of the invention, the tuning system of a VCR includes a timer circuit which is started by the user's activation of the VCR's PAUSE key to avoid recording a commercial message. A display element coupled to the timer circuit, upon expiration of a predetermined time period, indicates that the time period has expired, so that the viewer may, if he chooses, return the VCR to the record mode.

DETAILED DESCRIPTION OF THE EMBODIMENTS

The invention will now be described with respect to embodiments in a television receiver, a videocassette recorder (VCR), and a radio receiver.

Figure 1:
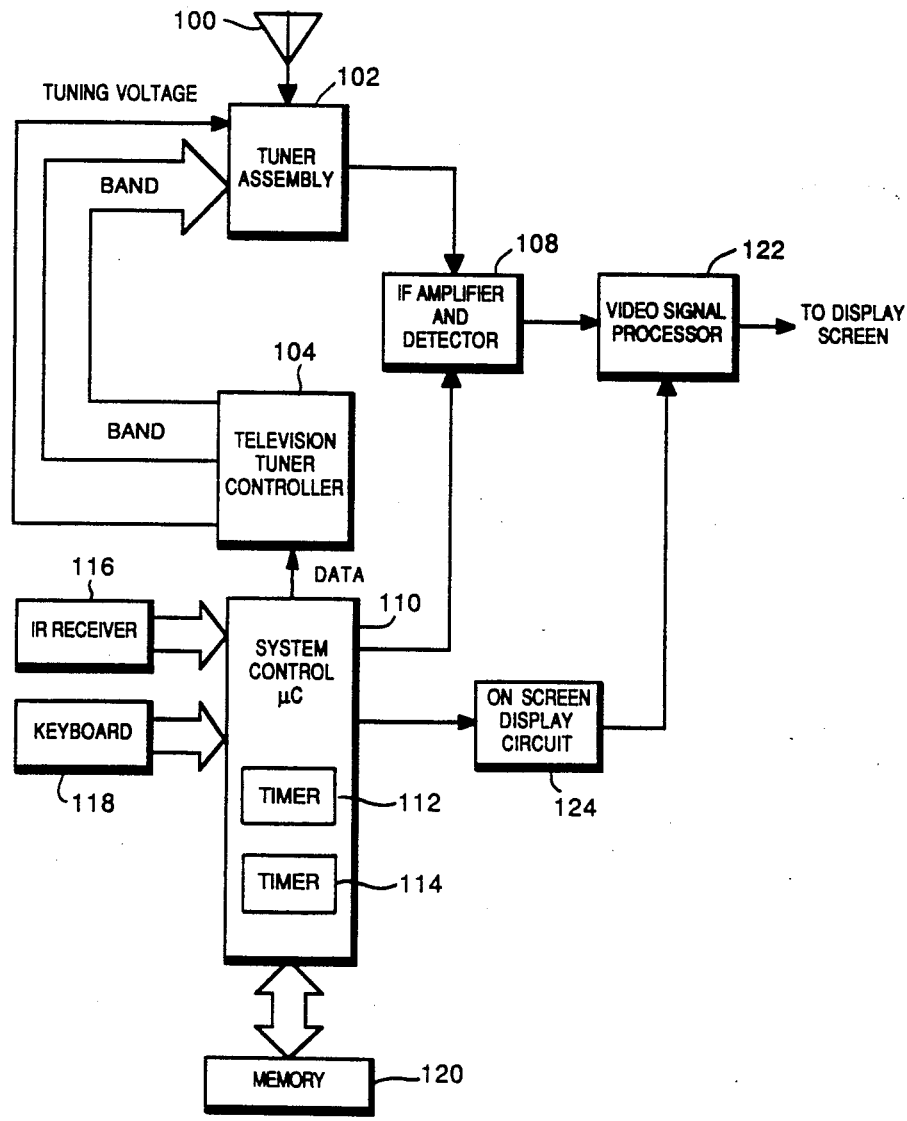
FIG. 1 shows in block diagram form a system suitable for use with the invention.

Referring to FIG. 1, a television receiver includes an antenna 100 which receives radio frequency (RF) signals and applies them to a tuner assembly 102. Tuner assembly 102 selects and amplifies a particular RF signal under control of a tuner controller 104, which provides bandswitching signals and tuning voltage signals to tuner assembly 102.

Tuner assembly 102 converts the received RF signal to an intermediate frequency (IF) signal and provides IF output signal to IF amplifier and detector 108. IF amplifier and detector 108 amplifies the IF signal applied to its input terminal and detects the video information contained therein. This detected video information is applied as one input to a video signal processor unit 122, the other input of which is connected to an on-screen display circuit 124. Detector 108 also detects sound information which is applied to a sound processing unit (not shown).

Tuner controller 104 generates the before-mentioned tuning voltage signals and bandswitching signals in response to control signals applied from a system control microcomputer (μC) 110. Microcomputer 110 receives user-initiated commands from an infrared (IR) receiver 116 and from a keyboard 118. Microcomputer 110 includes program memory (ROM) (not shown) and stores channel-related data in a random access memory (RAM) 120. RAM 120 may be of either the volatile or non-volatile type. One, skilled in the art will recognize that if volatile memory is utilized that it may be desirable to use a suitable form of standby power to preserve its contents when the receiver is turned off. Remote control signals are transmitted via infrared light (IR) although other media are possible.

Figure 2:
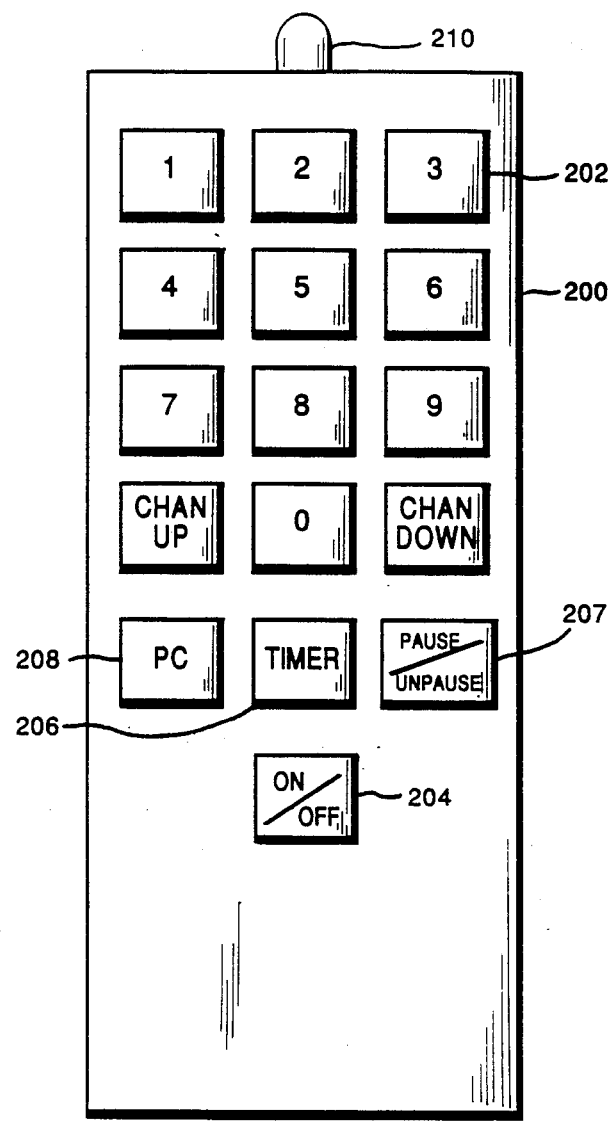
FIG. 2 illustrates a remote control handunit suitable for use with the invention.

IR receiver 116 receives IR signals transmitted by, for example, a remote control handunit such as the one shown in FIG. 2 and designated 200. Referring to FIGURE 2, remote control handunit 200 includes keys 202 for entering the digits 0-9, for entering "channel-up" and "channel-down" commands and a key 204 for turning the receiver "on" and "off." Remote control handunit 200 also includes a key 206 (labelled TIMER) and a key 208 (labelled PC), the operation of which will be described below. Remote control handunit 200 includes therein electronic circuitry (not shown) for encoding a signal to be transmitted by an IR diode 210 in accordance with the particular keys pressed. Similar control function command entries may be made via keyboard 118 located at the receiver itself.

Operation of the apparatus illustrated in FIGURES 1 and 2 will now be described with reference to the flow chart shown in FIG. 3 which represents the stored control program under which microcomputer 110 operates to implement an embodiment of the present invention.

If a viewer is watching a television program on, for example, channel 3, and the television program is interrupted for a commercial message, the viewer may activate the commercial message timer by tuning another channel in the usual way. In this embodiment TIMER key 206 serves no function and may be eliminated from remote control handunit 200 because the timer function is permanently enabled.

Alternatively, the timing function may be selectably enabled and disabled by use of TIMER key 206. That is, the activation of TIMER key 206 does not start the timer but only serves to enable the timing function. The timer itself is activated in response to a channel change command. The timing function is not automatically cancelled at the end of the timing period but remains enabled until TIMER key 206 is again activated.

In either of the above alternatives, when the TIMER function is enabled, a timer is started automatically upon the next channel change. In addition to starting the timer, the previous channel is stored automatically before the new channel is tuned.

Commercial messages are usually presented in multiples of 30 seconds in the United States. For this reason a timer 112 (implemented in this embodiment in microprocessor 110) is set to repeatedly time 30 second intervals and generate an output signal each time a 30 second interval expires. In response to the output signal of timer 112 an on-screen display (OSD) integrated circuit displays a suitable character or series of characters on the viewing screen as an indication to the viewer that the commercial message may be over.

Operation of PC key 208 of remote control handunit 200 causes the receiver to retune a channel in accordance with the information stored in the previous channel memory, and to store tuning information for the currently tuned channel in the previous channel memory. Repeated operation of the PC key will cause the receiver to "toggle" back and forth between two channels. This previous channel function is known per se in the art.

If the viewer finds that the second tuned channel is preferable to the first channel that he was watching, he may choose not to return to the first channel despite the repeated displayed elapsed time reminders. In regard to this situation, microprocessor 110 also includes a second timer 114 which times a second predetermined time interval, for example, 3 minutes in duration, and which is cleared to a zero count upon each channel change. If no channel change has occurred within 3 minutes after the first channel change, timers 112 and 114 reset and cleared, and no further reminder characters will be displayed on the viewing screen.

Figure 3:
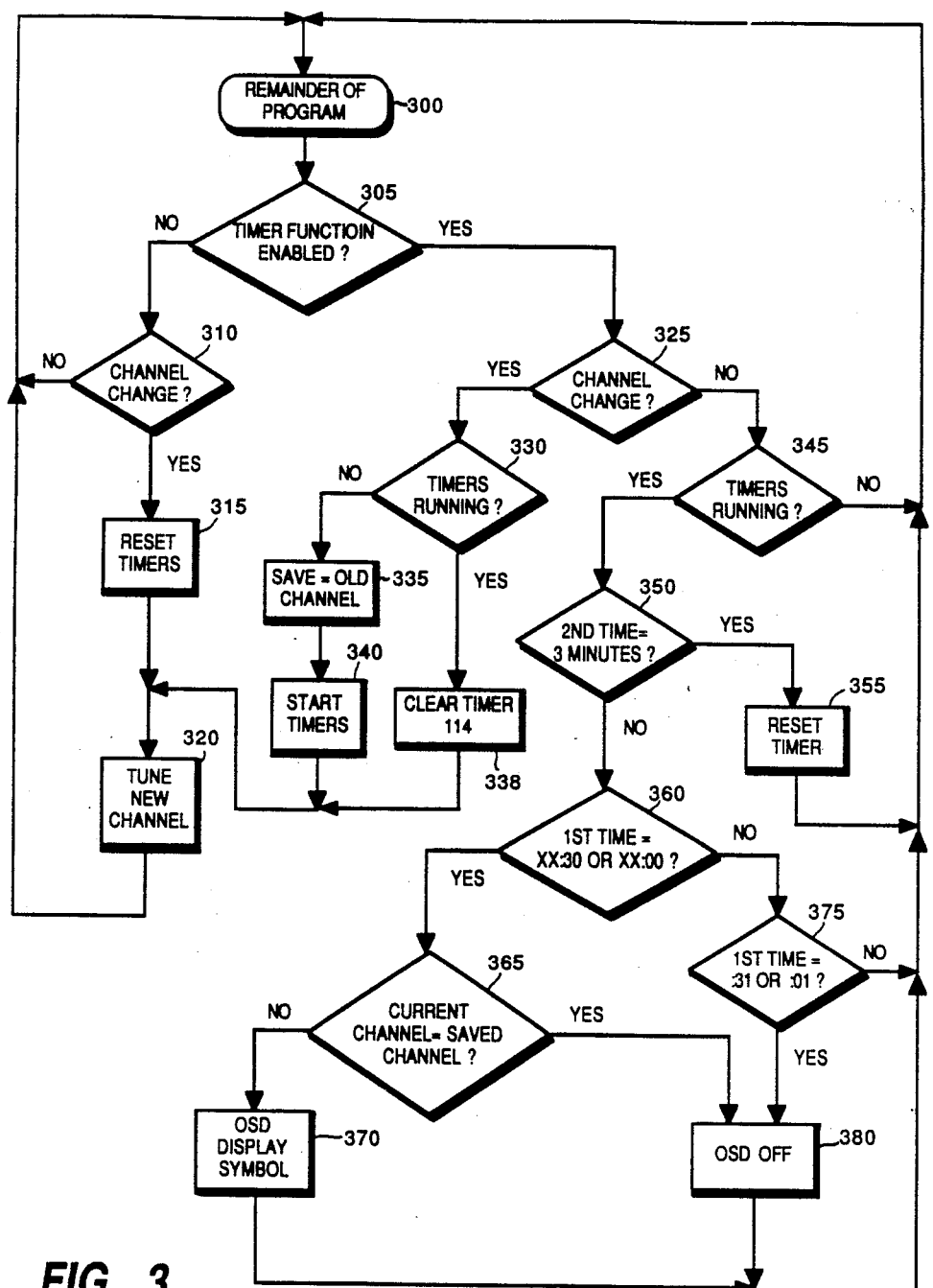
FIGS. 3 and 4 are flowcharts of a program used by the controller of FIG. 1, to implement an embodiment of the invention.

As shown in FIG. 3, the control program for microcomputer 110 is series of instructions forming a complete loop which is continuously and repeatedly executed. The relevant portion of the control program is shown in detail while the remaining portion is illustrated for simplicity as a single block of code 300. In step 305, under program control microcomputer 110 checks to see if the timer function is enabled. If the timer function is not enabled, the program advances to step 310 wherein a decision is made as to whether a channel change command has been received. If not, the timer routine is exited and control is transferred to another portion of the program. If, on the other hand, a channel change command were received, the timers are reset (step 315), the new channel is tuned (step 320), and the timer routine exited.

As noted above, the timer function may be permanently enabled, in which case decision blocks 305 and 310, and function block 315 may be omitted, and control would pass directly from code block 300 to step 325.

If the timer function is enabled, a check is made to see if a channel change command has been received (step 325). If so, the timers are read to determine if they are already running (step 330). If the timers are not running, the tuning information for the currently tuned channel is stored in memory (step 335), the timers are started (step 340) and the new channel tuned (step 320). If, however, the timers were already running at step 330 (indicating that tuning information regarding the previous channel has already been stored), the program causes microcomputer 110 to clear timer 114 to a count of zero (step 328) before advancing to step 320 to tune the new channel. This feature allows the user to step through a series of channels during a commercial message while timer 112 is running, while providing the viewer with a full 3 minutes of reminder messages on the last channel tuned. Note that the stored tuning information for the originally tuned channel is retained. That is, each additional channel change does not destroy the stored original channel data.

Returning to FIG. 3, at step 325, if a channel change command has not just been received, then the program advances to step 345 wherein the timers are checked to see if they are running. If they are running, then timer 114 is read to see if 3 minutes have elapsed since the last received channel change command was received (step 350). If so, it is assumed that the user now wishes to remain tuned to a new channel, and the timers are reset (step 355), and no further reminders will be displayed.

If, however, less than 3 minutes have elapsed since the last received channel change command, timer 112 is read. In the elapsed time information of timer 112, the minutes are a "don't care" (as will be explained below) and are symbolized by "XX" in decision diamond 360. However, the seconds count is important in step 360, and is checked for the conditions of "00" and "30", so that intervals of 30 seconds may be detected. If the end count of a 30 second interval (i.e. "30" or "00") is detected, then a test is performed to determine if the number of the currently tuned channel is equal to the number of the stored channel (step 365). If the viewer has caused the original channel to be tuned, no reminders need to be displayed (and are not). Thus the OSD is turned on to display a reminder (step 370) only when the receiver is tuned to a channel other than the starting (stored) channel. In that case, the on-screen display (OSD) circuit 124 is directed to display a suitable symbol on the screen as a reminder that a 30 second interval has expired, and that therefore the commercial message being avoided may be over (step 370). If, however, timer 112 does not contain a count of 00 or 30 seconds then the program advances to decision diamond 375, wherein a check is made to see if the count of timer 112 is equal to 01 or 31. If so, the OSD circuitry is directed to stop displaying the reminder message on the receiver display screen (step 380). The result of this feature is that the reminder will be displayed for 1 second only, every 30 seconds. If the count of timer 112 is not equal to 01 or 31, then the routine is exited.

Figure 4:
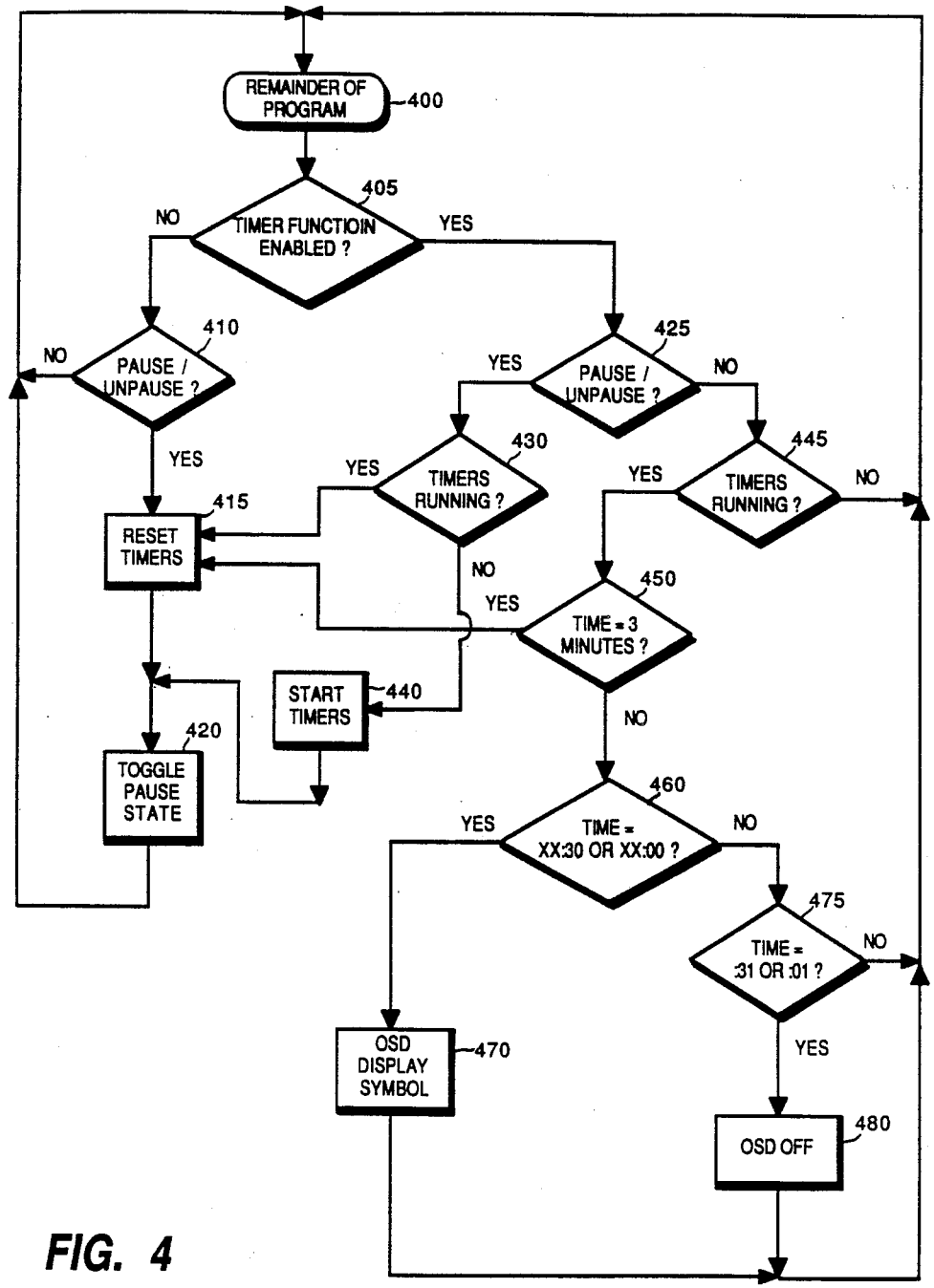

FIG. 4 illustrates a similar routine (with similarly numbered steps) for use in a VCR to avoid recording the commercial messages which accompany television programs. When a commercial message occurs in a television program which is being videotaped, the user may prevent the taping of the commercial message by pressing the PAUSE/UNPAUSE key of the VCR or of a VCR remote control unit (e.g. PAUSE/UNPAUSE key 207 of FIG. 2). In this embodiment of the invention, the fact that the commercial message is over is plainly apparent to the viewer, and the reminder-message displayed each 30 seconds serves to remind the viewer to "unpause" the VCR so as to resume recording.

Referring to FIG. 4, as was the case with respect to FIG. 3, decision steps 405 and 410 may be omitted if the timer function is permanently enabled. If however, the timer function is not enabled and a PAUSE/UNPAUSE command is received, the timers are reset (step 415) and the pause state is switched (toggled) to the opposite state. That is, if the videocassette player were in the paused state, it will be unpaused, and if it were in the unpaused state, the player will enter the paused state.

Assuming that the timer function is enabled, the program advances directly to step 425 wherein it checks to see if a PAUSE/UNPAUSE command has been received If so, then the timers are checked to see if they are already running (step 430). If the timers are not already running, they are started (step 440) and the videocassette recorder is placed in the paused state (step 420). If, however, the timers were already running (step 430), then they are reset (step 415) and the videocassette recorder is unpaused (step 420). If at step 425 no PAUSE/UNPAUSE command had been received, then the timers are checked to see if they are running (step 445). If they are running, timer 114 is read to see if 3 minutes have elapsed since the last PAUSE/UNPAUSE command was received (step 450). If so, it is assumed that the user prefers that the remainder of the program be taped. Therefore the timers are reset (step 415) and the VCR is unpaused (step 420). The remaining blocks 460-480 perform in the same manner as previously described with reference to blocks 360-380 of FIG. 3, and therefore need not be described again.

Figure 5:
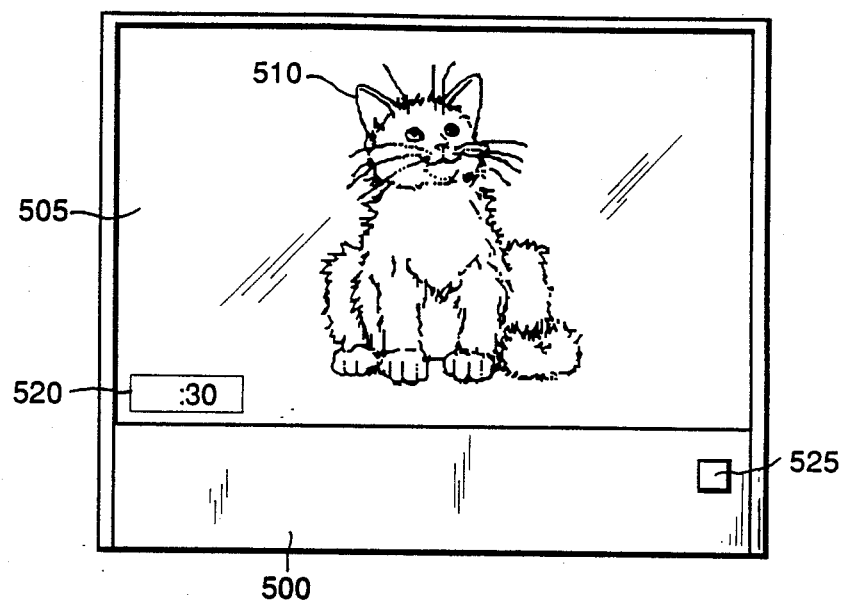
FIG. 5 is an illustration of a television receiver display screen displaying a reminder message produced in accordance with the invention.

FIG. 5 shows a front panel 500 and display screen 505 of a television receiver. In each of the above-described embodiments, the OSD reminder symbol will be displayed along with a displayed image 510 on display screen 505 for 1 second every 30 seconds, as shown for example in block 520. In the VCR embodiment the reminder symbol may be displayed on a television receiver as shown in FIG. 5 but it will not be recorded because the VCR is in the PAUSE mode when the OSD reminder symbol is displayed and also because OSD messages are not usually coupled through the recording circuitry.

Because some viewers may need or want more instruction than others, it is herein recognized that the displayed reminder may be anything from a single character to a sentence of text, or even a graphics symbol. Alternatively, an indicator 525 mounted on front panel 500 may also be used to remind the viewer that the commercial message may be finished. In a VCR or radio receiver indicator 525 would be mounted in a similar position on the front panel of the unit. If such an indicator is used then steps 370, 470, 770 and 380, 480, 880 of the flowcharts of FIGS. 3, 4 and 7 would be suitably modified to control the front panel indicator. Such an indicator may be, for example, a simple LED or lamp, or an alphanumeric display. Indicator 525 would be particularly advantageous in lower cost receivers which are not equipped with OSD circuitry. In some applications it may be desirable to display the count of timer 112 continuously as it is incremented. It may also be desirable that each of the above options be made selectable by the viewer.

Figure 6:
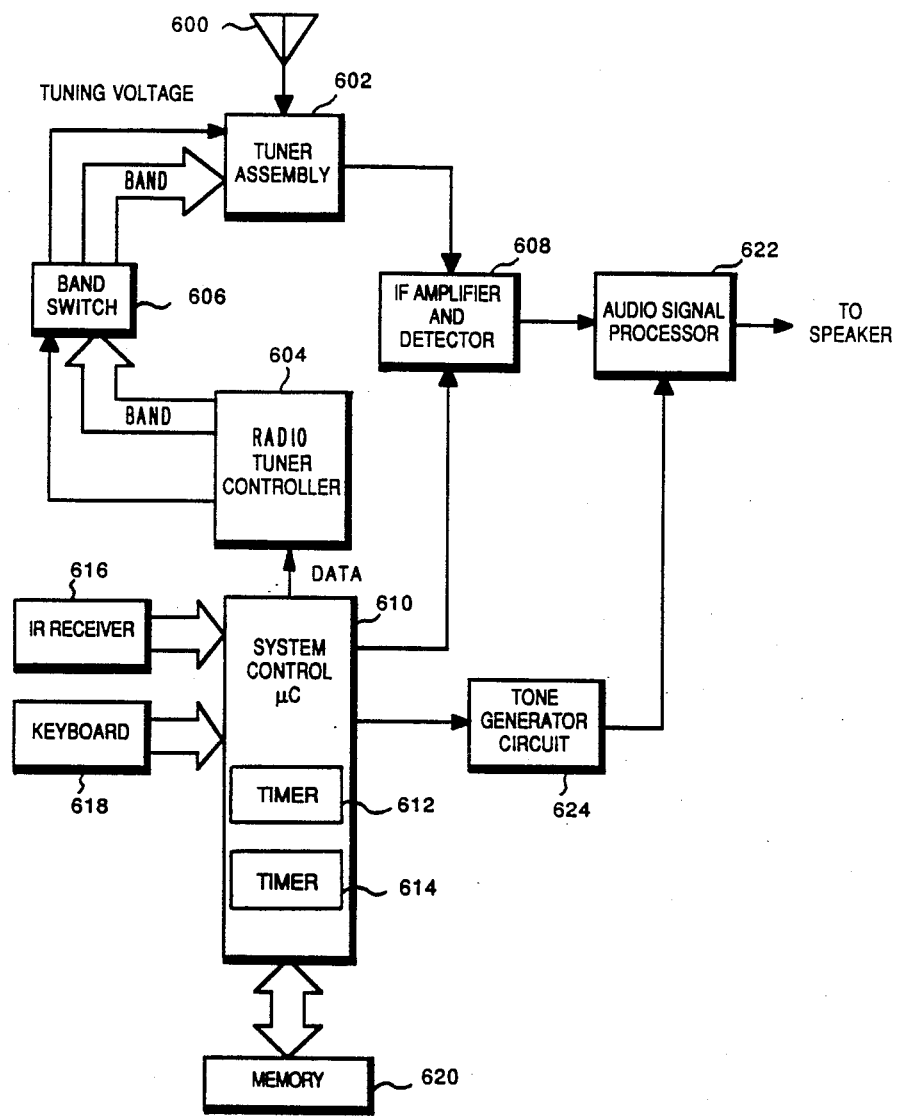
FIG. 6 illustrates, in block diagram form, apparatus suitable for use with another aspect of the invention.
Figure 7:
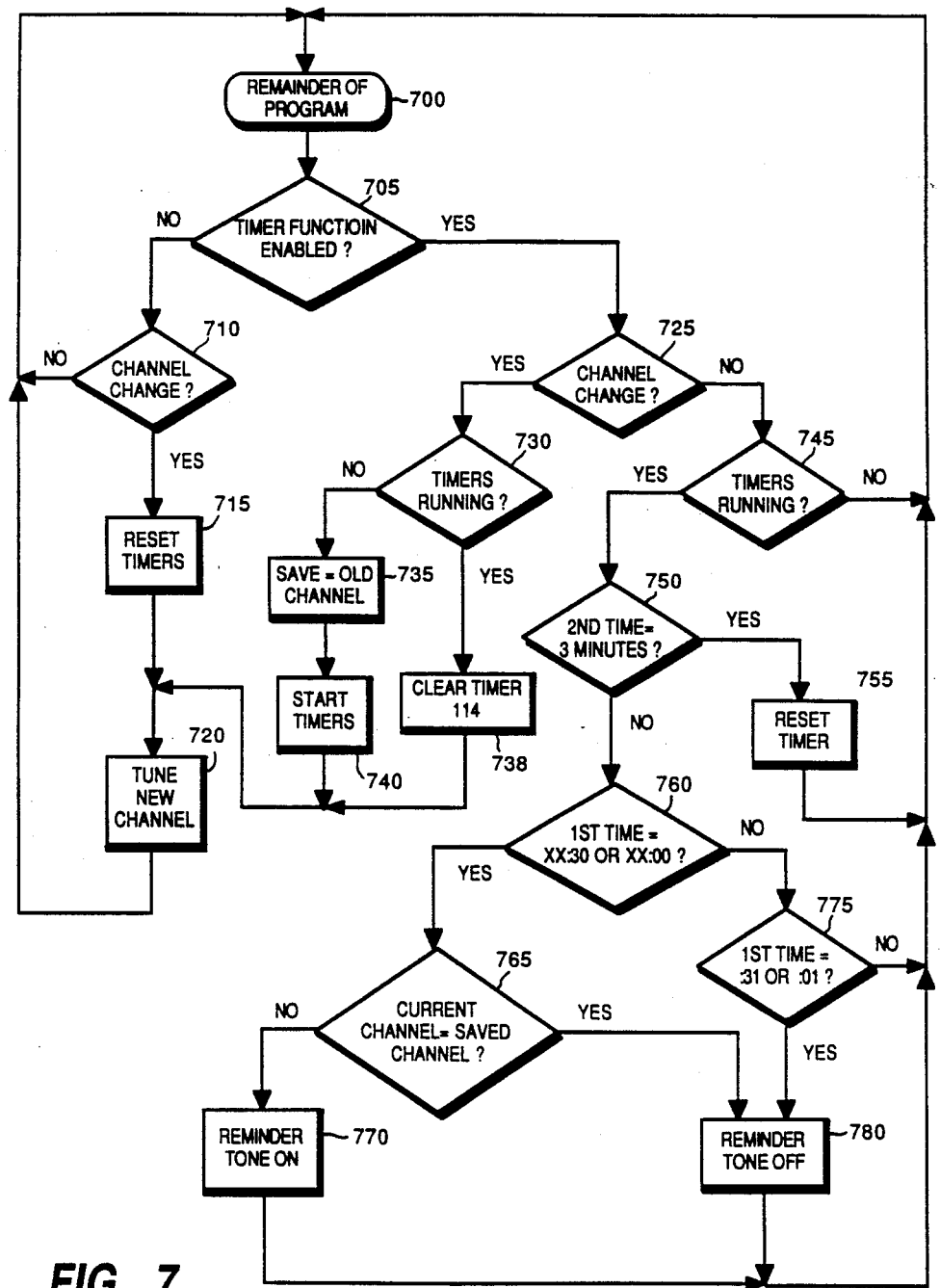
FIG. 7 is a flowchart of a program used by the controller of FIG. 6 to implement that aspect of invention.

It is also herein recognized that the invention is useful in a radio receiver as well, although in that case the reminder indication may be in the form of an audio signal rather than a character or series of characters displayed on a display screen. Such a system is illustrated in FIG. 6, in which elements similar in function to elements of FIG. 1 are given similar numbers. The flowchart of FIG. 7 illustrates the relevant portion of the control program of the control microprocessor of a radio receiver. The only difference between its operation and operation in accordance with the flowchart of FIG. 3 is that blocks 770 and 780 control the generation of an audio reminder tone for processing along with the normal audio signal rather than the generation of an OSD character or series of characters. Of course, an audio reminder tone of this type also lends itself to both television receiver and VCR application.

What is claimed is:

1. Apparatus for use in a radio frequency (RF) signal receiver, comprising;
   data input means for generating data in response to activation by a user;
   control means coupled to said data input means for generating a tuning control signal in response to data received from said data input means;
   tuning means responsive to said tuning control signal for selecting an RF signal from a plurality of RF signals applied thereto;
   memory means coupled to said control means for storing data relating to said tuning control signal;
   timing means coupled to said control means for timing a predetermined period and for producing a timing signal;
   said control means in response to said data from said data input means also causes said memory means to store channel data indicative of a first tuned channel, and causes said timing means to begin timing said time period, and, upon expiration of said time period said control means generates a signal indicative of the expiration of said time period if said tuning means is tuned to a different channel when said time period expires.

2. The apparatus of claim 1 wherein said control means is a microcomputer.

3. The apparatus of claim 2 wherein said timing means produces a signal indicative of the time remaining in said time period, and said control means causes said display means to display said signal indicative of the time remaining in said period.

4. The apparatus of claim 1 for use in a television receiver wherein said data entered by a user is a channel change command.

5. The apparatus of claim 4 wherein said signal indicative of the expiration of said time period is a video signal.

6. The apparatus of claim 4 wherein said signal indicative of the expiration of said time period is an audio signal.

7. The apparatus of claim 1 for use in a radio receiver wherein said data entered by a user is a channel change command.

8. The apparatus of claim 7 wherein said signal indicative of the expiration of said time period is an audio signal.

9. Apparatus for use in a television system, comprising:
   display means for displaying television images;
   control means for generating a tuning control signal in response to data;
   data input means coupled to said control means for generating said data in response to activation by a user;
   tuning means responsive to said tuning control signal for selecting an RF signal from a plurality of RF signals applied thereto;
   memory means coupled to said control means for storing data relating to said tuning control signal;
   timing means coupled to said control means for producing a timing signal;
   on screen display means for generating characters for display on said display means;
   said control means, in response to said data input by said user, causes said memory means to store data indicative of the tuned channel, and causes said timing means to begin timing a predetermined time period, and, upon expiration of said time period, said control means causes said on screen display means to generate a signal indicative of the expiration of said time period if said tuning means is tuned to a different channel when said time period expires.

10. The apparatus of claim 9 wherein said control means is a microcomputer.

11. The apparatus of claim 10 wherein said timing means produces a signal indicative of the time remaining in said time period.

12. Apparatus for use in a videocassette recorder, comprising:
   control means for causing said videocassette recorder to change state between paused and unpaused states in response to data indicative of a PAUSE command and a command for unpausing said videocassette recorder, respectively;
   data input means coupled to said control means for generating said data indicative of said PAUSE command in response to activation by a user;
   timing means coupled to said control means for producing a timing signal;
   on screen display means for generating signals representative of characters;
   said control means in response to said PAUSE command also causes said timing means to begin timing a predetermined time period, and, upon expiration of said time period, said control means causes said on screen display means to generate a character signal indicative of the expiration of said time period if said videocassette recorder is in said paused state when said time period expires.

13. The apparatus of claim 12 wherein said control means is a microcomputer.

14. Apparatus for use in a videocassette recorder, comprising:
   control means for causing said videocassette recorder to change state between paused and unpaused states in response to indicative of a PAUSE/UNPAUSE command;
   data input means coupled to said control means for generating said data indicative of said PAUSE/UNPAUSE command in response to activation by a user;
   timing means coupled to said control means for producing a timing signal;
   indicator means mounted on a panel of said videocassette recorder and coupled to said control means for displaying an indication;
   said control means in response to said PAUSE command also causes said timing means to begin timing a predetermined time period, and, upon expiration of said time period, said control means causes said indicator means to display a signal indicative of the expiration of said time period if said videocassette recorder is in said paused state when said time period expires.

15. The apparatus of claim 14 wherein said control means is a microcomputer.

16. Apparatus for use in a television receiver, comprising:
   control means for generating a tuning control signal in response to data;
   data input means coupled to said control means for generating said data in response to activation by a user;
   tuning means responsive to said tuning control signal for selecting an RF signal from a plurality of RF signals applied thereto;
   memory means coupled to said control means for storing data relating to said tuning control signal;
   timing means coupled to said control means for timing a predetermined time period and producing a timing signal;
   display means coupled to said control for displaying an indication related to said predetemined time period;
   said control means causes said memory means to store data indicative of the tuned channel, and causes said timing means to begin timing a predetermined time period, and, upon expiration of said time period, said control means causes said display means to display a signal indicative of the expiration of said time period if said tuning means is tuned to a different channel when said time period expires.

17. The apparatus of claim 16 wherein said control means is a microcomputer.

18. The apparatus of claim 17 wherein said timing means produces a signal indicative of the time remaining in said time period.

19. The apparatus of claim 18 wherein said display means is mounted on a panel of said receiver and is an illuminated display device.

20. The apparatus of claim 19 wherein said illuminated display device is an alphanumeric display.

21. The apparatus of claim 19 wherein said display means is a light emitting diode.

* * * * *